United States Patent [19]

Graefe et al.

[11] Patent Number: 5,344,511
[45] Date of Patent: Sep. 6, 1994

[54] HEAT SHRINKABLE PLASTIC HOSE AND METHOD FOR MANUFACTURING

[75] Inventors: Detlef Graefe, Hagen; Dieter Sagemuehl, Herdecke, both of Fed. Rep. of Germany

[73] Assignee: RXS Schrumpftechnik-Garnturen GmbH, Hagen, Fed. Rep. of Germany

[21] Appl. No.: 78,772

[22] Filed: Aug. 5, 1993

Related U.S. Application Data

[63] Continuation of Ser. No. 770,248, Oct. 3, 1991, abandoned.

[30] Foreign Application Priority Data

Jan. 10, 1991 [DE] Fed. Rep. of Germany ....... 4100564

[51] Int. Cl.⁵ .................................................. B32B 31/26
[52] U.S. Cl. .......................................... 156/85; 156/86; 156/149; 156/244.13; 138/125; 138/126; 264/230; 264/342 R
[58] Field of Search ............... 156/85, 86, 149, 224.13; 138/125, 126; 264/230, 342 R

[56] References Cited

U.S. PATENT DOCUMENTS

| | | | |
|---|---|---|---|
| 2,652,093 | 9/1953 | Burton | 156/86 |
| 2,888,954 | 6/1959 | Gates | 156/149 |
| 2,988,130 | 6/1961 | Rittenhouse | 156/86 |
| 3,223,565 | 12/1965 | Fritz et al. | 156/86 |
| 3,284,259 | 11/1966 | Galloway et al. | 156/244.13 |
| 3,459,621 | 8/1969 | Kamenyarzh et al. | |
| 3,755,032 | 8/1973 | Higbee | 156/149 |
| 3,945,867 | 3/1976 | Heller et al. | 156/244.13 |
| 4,035,454 | 7/1977 | Klein | 264/342 R |
| 4,308,895 | 1/1982 | Greco | 138/125 |
| 4,326,905 | 4/1982 | Tanaka | 156/149 |
| 4,407,888 | 10/1983 | Crofts | 264/230 |
| 4,446,095 | 5/1984 | Katz et al. | 264/230 |
| 4,515,737 | 5/1985 | Karino et al. | 156/244.13 |
| 4,631,098 | 12/1986 | Pithouse et al. | 264/342 R |
| 4,707,203 | 11/1987 | Besche et al. | 264/230 |
| 4,836,872 | 6/1989 | Landry et al. | 264/342 R |
| 5,019,309 | 4/1991 | Brunnhofer | 156/244.13 |

FOREIGN PATENT DOCUMENTS

| | | |
|---|---|---|
| 0299438 | 7/1988 | European Pat. Off. |
| 0324630 | 7/1989 | European Pat. Off. |
| 0350732 | 1/1990 | European Pat. Off. |
| 0416352A2 | 3/1991 | European Pat. Off. |
| 0494641A2 | 7/1992 | European Pat. Off. |
| 1960595 | 6/1971 | Fed. Rep. of Germany |
| 3824757A1 | 2/1989 | Fed. Rep. of Germany |
| 1141306 | 1/1969 | United Kingdom |

*Primary Examiner*—Caleb Weston
*Attorney, Agent, or Firm*—Hill, Steadman & Simpson

[57] ABSTRACT

A method for manufacturing a heat-shrinkable hose, wherein at least one shrinkable thread is wound around a basic hose element. A cover hose is provided that surrounds the basic hose element and overlies the heat-shrinkable thread. Longitudinal supporting threads can be provided for additional reinforcement.

22 Claims, 2 Drawing Sheets

HEAT SHRINKABLE PLASTIC HOSE AND METHOD FOR MANUFACTURING

This is a continuation of application Ser. No. 07/770,248 filed Oct. 3, 1991, abandoned.

FIELD OF THE INVENTION

The invention is directed to heat-shrinkable plastic hoses having heat-shrinkable threads, and to a method for manufacturing such hoses.

BACKGROUND OF THE INVENTION

In manufacturing heat-shrinkable hoses or pipes of thermoplastic material, it is known generally to continuously extrude the hose, which is then cross-linked and, finally, continuously or discontinuously expanded.

It is also known to manufacture heat-shrinkable hoses of a fabric of threads, wherein a thread extending circumferentially around the hose has heat-shrinking properties, as disclosed by U.S. Pat. No. 3,669,157. Threads extending longitudinally along the axis of the hose are non-shrinkable. The threaded fabric is sealed by saturating the hose with curable substances. This method is relatively time-consuming and expensive.

SUMMARY OF THE INVENTION

It is, therefore, an object of the present invention to provide a method with which a tight, heat-shrinkable plastic hose can be manufactured simply and economically.

It is another object of the invention to provide heat-shrinkable plastic hose that is strong and resistant to tearing.

It is a further object of the invention to provide a heat-shrinkable plastic hose that has a uniform wall thickness, and is capable of exhibiting relatively high shrink factors.

These and other objects are inventively achieved by providing a method in which a basic hose element of plastic material is extruded, and at least one heat-shrinkable thread is helically, continuously wound onto the basic hose element. Subsequently, a cover hose of plastic material is extruded onto the wound basic hose element in a second extruder, after which the hose is cross-linked.

The resultant hose includes an inner basic hose element of extruded plastic material, a shrinkable thread wound around the basic hose element, and an outer cover layer of extruded thermoplastic material.

Among the advantages of the invention are that heat-shrinkable plastic hoses manufactured in accordance with the method of the present invention can be continuously manufactured in virtually any predetermined length or diameter, or in discontinuously manufactured sections. It is especially advantageous that no expansion or stretching processes are needed in the method itself, since a shrink element (a heat-shrinkable plastic thread) that is already pre-stretched is used to provide the necessary shape memory of the plastic hose. It is also advantageous that the required degree of shrinkage can be pre-selected within broad ranges, without using special equipment or complicated materials and apparatus. Corresponding hose shrinkage can be determined by suitable selection of the shrinkable thread, winding arrangement, thermoplastic material, and degree of cross-linking. These factors may be varied and selected without substantially changing the manufacturing method itself. It is also advantageous that the present method eliminates complicated and difficult-to-adjust expansion or stretching devices.

Other objects and advantages of the present invention will be apparent upon reference to the accompanying description when taken in conjunction with the following drawings.

DESCRIPTION OF THE PREFERRED EMBODIMENT

Figure 1:
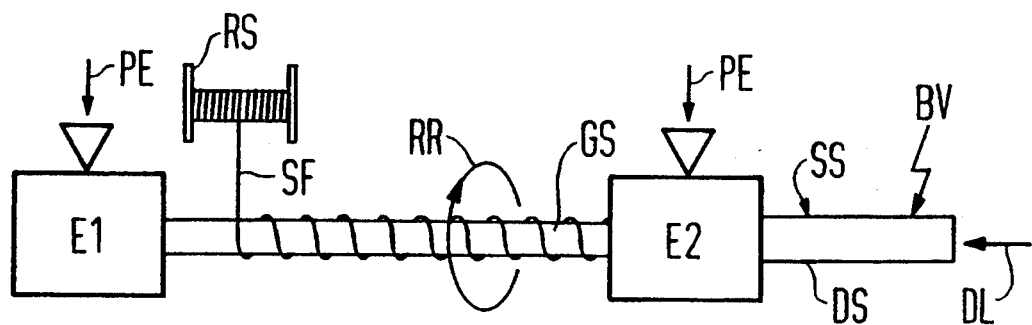
FIG. 1 is a schematic illustration of an exemplary embodiment of a method in accordance with the principles of the present invention.

FIG. 1 illustrates the principles of a manufacturing method in accordance with the present invention. A plastic material (for example polyethylene) is introduced into a first extruder E1, and extruded to form a basic hose element GS. A heat-shrinkable thread SF is provided on a supply reel RS, is continuously helically wound around the circumference of the basic hose element GS. The wound basic hose element GS is then introduced into a second extruder E2, in which a cover hose DS is extruded.

In the illustrated embodiment, the thread SF is provided as an stretched plastic thread (preferably of polyethylene). The plastic thread SF can be either cross-linked or non-cross-linked, dependent on the desired usage and characteristics of the finished plastic hose. The shrinkable thread SF can be selected to have a stretch factor of up to 20, providing a radial shrink factor of 5 through 10 for the finished plastic hose.

In the illustrated example, the shrinkable thread SF is applied to the basic hose element GS by rotation of the supply reel RS in a direction corresponding to arrow RR. The pitch of the helical winding is defined by the feed, or extrusion speed, of the basic hose element GS, and can be varied as needed within limits. Such winding processes are generally known per se in cable manufacturing technology.

In the second extruder E2, the cover hose DS is extruded onto the wound basic hose element GS, thus covering the wound thread SF. The plastic hose, while it is still soft, can be protected against collapse by introducing compressed air DL into the inside of the hose. The introduction of compressed air to prevent collapse is known per se.

Any suitable thermoplastic material can be selected for the cover hose DS, as long as the material can adhere to the wound basic hose element GS. Polyethylene is a particularly suitable material for this purpose, and represents the best mode currently known to the inventors.

Following the extrusion of the cover hose DS, the completely extruded shrink hose SS is supplied to a cross-linking mechanism BV. A high-energy irradiation cross-linking mechanism is preferred; however, chemical cross-linking with peroxides or silane is also possible. As a result of cross-linking, the shrink hose SS acquires the properties of resistance to melting and resistance to dripping at shrinking temperature. The cross-linking, moreover, also promotes the mutual adhesion of the individual layers to one another.

Of course, it is also possible to divide the method into individual sections, each of which would represent one sub-step or a plurality of sub-steps. For example, it can be expedient to separate the cross-linking process from the extrusion process, since the apparatus used in these two stages are usually spatially separated from one another. In this case, the shrink hose SS would then have to be cooled before it was to be stored or transported.

Figure 2:
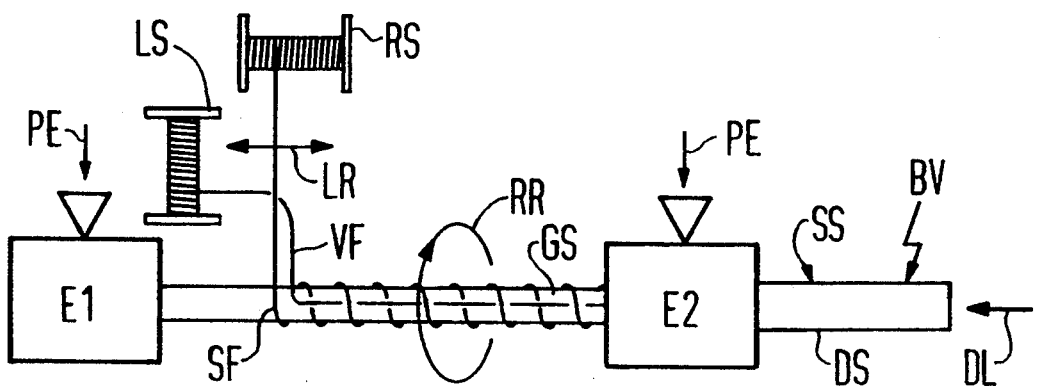
FIG. 2 is a schematic illustration of a second exemplary embodiment of a method in accordance with the principles of the present invention.

FIG. 2 illustrates a second exemplary embodiment. In addition to the circumferential heat-shrinkable thread SF (applied in the same way as illustrated in FIG. 1), a plurality of longitudinal reinforcing threads VF are applied onto the basic hose element GS. As indicated in FIG. 2, a supply reel LS reciprocates in a direction indicated by arrow LR, in a parallel longitudinal direction relative to the extruded shrink hose element GS. This allows the reinforcing threads VF to be applied simultaneously with, and in cooperation with, the winding of the heat-shrinkable threads SF. The reinforcement threads VF can be provided as thermally stable fibers, such as glass fibers. A plurality of supply reels LS can be provided, so that a plurality of longitudinal reinforcement elements VF are incorporated as supporting elements.

By selecting a suitable pitch for the helical application of the shrinkable thread SF in cooperation with the application of the supporting thread (or threads) VF, a fabric structure (FIG. 5) can be manufactured. The provision of the cover hose and crosslinking are accomplished as set forth in the description of the FIG. I embodiment.

Figure 3:
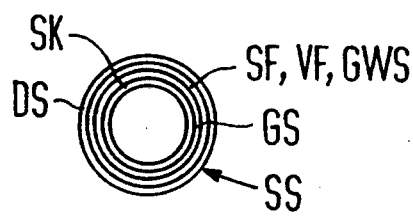
FIG. 3 illustrates a schematic cross-sectional view taken through a plastic hose of the invention.

FIG. 3 illustrates a completed hose SS in cross section. As shown in this view, an optional inside coating of hot-melt adhesive SK can be applied to the inside surface of the hose SS, either by co-extrusion with the basic hose element GS or, in a discontinuous manufacturing arrangement, in a further method step. Proceeding radially outwardly from the center of the hose, the coating SK is followed by the basic hose element GS (composed of a thermoplastic material, preferably polyethylene). The next layer is a ply formed by the winding (including the shrinkable element composed of a helically applied, shrinkable thread SF and the longitudinal reinforcement elements VF). Finally, the entire combination is covered by the cover hose DS. It is contemplated that the shrinkable thread SF could be cross-linked before being applied onto the basic hose element.

Figure 4:
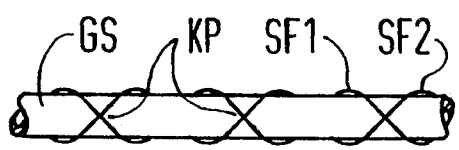
FIG. 4 schematically illustrates the principles of operation of a shrinkable plastic hose including a plurality of shrinkable threads.

FIG. 4 illustrates an embodiment wherein at least two shrinkable threads SF 1 and SF2 are helically applied onto the basic hose element GS, with the threads SF 1 and SF2 crossing at intersections KP. Advantageously, the shrinkable threads SF 1 and SF2 can be fixed to one another at the intersections KP, for example by fusing the threads together. The shrinkable threads SF1 and SF2 are thereby prevented from "running away" from one another in a longitudinal direction during the shrinking process.

Figure 5:
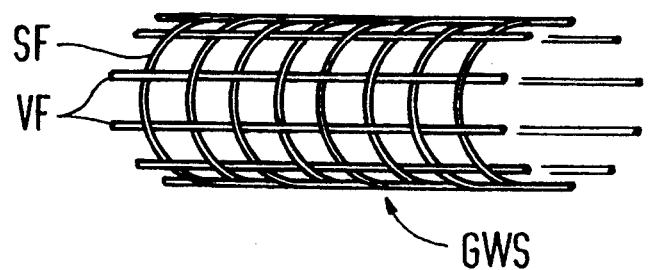
FIG. 5 shows a shrinkable fabric that can be embedded in the plastic hose.

FIG. 5 shows a pre-manufactured shrinkable fabric hose GWS. The hose GWS includes circumferential shrinkable threads SF and longitudinal reinforcement threads VF. The pre-manufactured fabric hose GWS can be used in a discontinuous manufacturing process, in which the fabric hose must first be pushed onto a supply arbor, from which it is then installed on the basic hose. Subsequently, a cover layer DS is applied by a suitable method, for example by being rolled onto, extruded onto, or shrunken onto, the basic hose.

Yet another example of a discontinuous manufacturing process, the basic hose element GS, after having already solidified, can be turned on a lathe. In this process, the shrinkable thread SF does not have to be rotated around the basic hose, but can merely be fed from the supply reel RS onto the rotating basic hose. Subsequently, the cover layer is applied in a second extruder. The cover hose may be applied as set forth hereinabove, or, by a suitable alternative method. For example, three rollers could be used, with which the extruded cover hose DS could be applied onto the wound basic hose element GS. In a further alternative, a dilitated and shrinkable cover hose could be applied.

Figure 6:
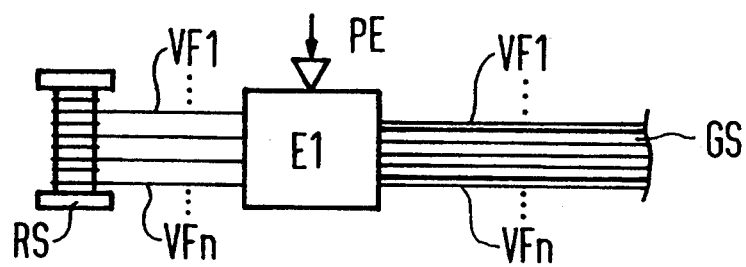
FIG. 6 shows the manufacture with the supporting thread entering into the extruder.

FIG. 6 illustrates an alternative step for applying longitudinal supporting threads VF1 through VFn. In this embodiment, supporting threads are introduced into the extruder E1, so that the longitudinal threads are applied to the exiting basic hose element GS as it is extruded. Subsequent steps of winding and cross-linking are implemented as described hereinabove.

Figure 7:
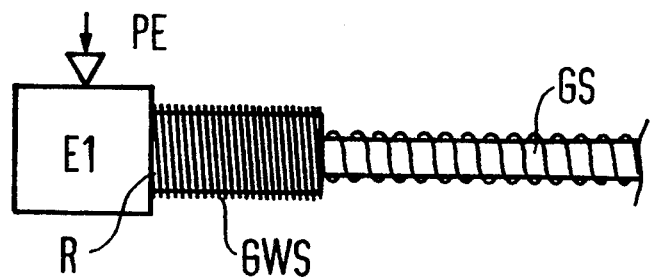
FIG. 7 shows the manufacture with a fabric hose.

FIG. 7 illustrates another exemplary embodiment, wherein a supply pipe R is secured to an exit end of the extruder E1. A supply of a telescoped "fabric stocking" is disposed on the supply pipe R. As the extruded basic hose element GS passes by, the fabric stocking GWS is continuously applied to the surface of the basic hose element GS.

The method described hereinabove, and the heat-shrinkable plastic hose manufactured according to the method, offer several advantages over known methods and hoses. The method of the present invention eliminates the problems involved with previous methods using expansion, and allows relatively large diameter hoses to be continuously manufactured. The method also allows for more uniform cross-linking. Hoses manufactured according to the method exhibit increased mechanical strength and resistance to tearing at the edges by comparison with hoses manufactured according to known methods. Furthermore, hoses manufactured according to the present method have more uniform wall thicknesses, and exhibit greater shrink factors than presently known hoses. Greater shrink factors enable greater shrink differences, so that "cut collars" having longitudinal closures may be replaced.

Although the present invention has been described with reference to a specific embodiment, those of skill in the art will recognize that changes may be made thereto without departing from the scope and spirit of the invention as set forth in the appended claims.

We claim as our invention:

1. A method for continuously manufacturing a heat-shrinkable plastic hose having heat-shrinkable threads, said method consisting of the following steps:
continuously extruding a basic hose element of plastic material from a first extruder;
stretching at least one heat-shrinkable thread to form at least one pre-stretched thread;

helically continuously winding said at least one pre-stretched thread onto said basic hose element, thus continuously forming a heat-shrinkable wound basic house element having a shape memory;

continuously extruding a cover hose of plastic material from a second extruder onto said heat-shrinkable sound basic hose element, thus continuously forming a finished shrinkable hose having a radial shrink-factor of 5 through 10; and cross-linking said shrinkable hose.

2. A method according to claim 1, wherein said step of extruding a basic hose element comprises extruding a basic hose element of a thermoplastic material.

3. A method according to claim 2, wherein said step of extruding a basic hose element comprises extruding a basic hose element of polyethylene.

4. A method according to claim 2, wherein the same plastic material is employed for said basic hose element and for said cover hose.

5. A method according to claim 2, wherein said step of extruding a cover hose comprises extruding a cover hose of a thermoplastic material differing from the material employed for the basic hose element.

6. A method according to claim 1, further comprising the step of stretching said heat-shrinkable thread, with a stretch factor of 5 through 20, before said step of winding.

7. A method according to claim 6, further comprising the step of cross-linking said heat-shrinkable thread before said step of winding.

8. A method according to claim 1, further comprising the step of applying at least one longitudinal, heat-stable, reinforcing supporting thread to said basic hose element in a cylindrical surface plane.

9. A method according to claim 8, wherein said at least one supporting thread is applied to said basic hose element from a support thread supply reel reciprocating along a longitudinal axis of said basic hose element.

10. A method according to claim 8, wherein said at least one supporting thread is applied to said basic hose element simultaneously with, and in cooperation with, said step of winding said shrinkable thread.

11. A method according to claim 8, wherein said supporting threads are applied onto said basic hose element in said first extruder.

12. A method according to claim 1, wherein said step of cross-linking said shrink-hose comprises cross-linking said shrink hose in a cross-linking path at an exit side of said second extruder using a method chosen from a group consisting of cross-linking by high-energy irradiation and cross-linking chemically.

13. A method according to claim 1, wherein said step of winding further comprises helically winding a plurality of heat-shrinkable threads onto the basic hose element, such that said heat-shrinkable threads are generally parallel to one another.

14. A method according to claim 1, wherein said step of winding further comprises winding a plurality of shrinkable threads to form a lattice-like structure having thread intersections.

15. A method according to claim 14, further comprising the step of fusing said heat-shrinkable threads to one another at said intersections.

16. A method according to claim 1, wherein said step of winding further comprises providing said heat-shrinkable thread on a supply reel, and rotating said supply reel around said basic hose element.

17. A method according to claim 1, wherein said step of winding further comprises:

providing said heat-shrinkable thread on a supply reel;

feeding said heat-shrinkable thread from said supply reel; and rotating said basic hose element such that said heat-shrinkable thread is guided onto said basic hose element.

18. A method according to claim 1, wherein said step of extruding a cover hose comprises providing a plurality of rollers within said second extruder.

19. A method according to claim 1, wherein said step of extruding a basic hose element, said step of winding, said step of extruding a cover hose, and said step of cross-linking are discontinuously implemented.

20. A method as claimed in claim 1, wherein the step of stretching at least one heat-shrinkable thread is further defined by stretching at least one heat-shrinkable thread having a stretch factor of up to 20 to form at least one pre-stretched thread.

21. A method for discontinuously manufacturing a heat-shrinkable plastic hose having heat-shrinkable threads, said method consisting of the following steps:

stretching at least one heat-shrinkable thread to form at least one pre-stretched thread;

forming a cylindrical fabric section including said at least one pre-stretched thread as a circumferential thread and a plurality of longitudinal supporting threads;

extruding a basic hose element of plastic material from a first extruder;

applying said fabric section onto said basic hose element, thus forming a wound basic hose element;

impressing a shape memory onto said wound basic hose element;

extruding a cover hose of plastic material from a second extruder onto said wound basic hose element, thus forming a shrink-hose; and cross-linking said shrink-hose.

22. A method as claimed in claim 21, wherein the step of stretching at least one heat-shrinkable thread is further defined by stretching at least one heat-shrinkable thread having a stretch factor of up to 20 to form at least one pre-stretched thread.

* * * * *